(12) United States Patent
Misaki (10) Patent No.: US 8,872,180 B2
(45) Date of Patent: Oct. 28, 2014

(54) LIQUID CRYSTAL DISPLAY DEVICE AND METHOD FOR MANUFACTURING LIQUID CRYSTAL DISPLAY DEVICE

(75) Inventor: Katsunori Misaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1022 days.

(21) Appl. No.: 12/992,137

(22) PCT Filed: Mar. 24, 2009

(86) PCT No.: PCT/JP2009/001301
§ 371 (c)(1),
(2), (4) Date: Nov. 11, 2010

(87) PCT Pub. No.: WO2009/139104
PCT Pub. Date: Nov. 19, 2009

(65) Prior Publication Data
US 2011/0062447 A1  Mar. 17, 2011

(30) Foreign Application Priority Data

May 13, 2008 (JP) .................................. 2008-126233

(51) Int. Cl.
*H01L 29/04* (2006.01)
*H01L 31/20* (2006.01)
*H01L 31/036* (2006.01)
*H01L 31/0376* (2006.01)
*G02F 1/1335* (2006.01)

(52) U.S. Cl.
CPC ................................ *G02F 1/133555* (2013.01)
USPC ............. 257/59; 257/104; 257/359; 257/737; 257/E21.051; 257/E21.053; 257/E21.352; 257/E21.499

(58) Field of Classification Search
USPC ............... 257/59, 79, 82, 104, 359, 431, 678, 257/687, 737, E21.051, E21.053, E21.259, 257/E21.352, E21.499
See application file for complete search history.

(56) References Cited

U.S. PATENT DOCUMENTS 5,418,635 A  5/1995  Mitsui et al.
5,724,111 A  3/1998  Mizobata et al.
(Continued)

FOREIGN PATENT DOCUMENTS

JP  09-101510 A  4/1997
JP  2001-337322 A  12/2001

OTHER PUBLICATIONS

English translation of Official Communication issued in corresponding International Application No. PCT/JP2009/001301, mailed on Dec. 23, 2010.

(Continued)

*Primary Examiner* — David Nhu
(74) *Attorney, Agent, or Firm* — Keating & Bennett, LLP (57) ABSTRACT

A production method for a liquid crystal display device having a plurality of thin film transistors (TFTs) including reflection sections disposed to correspond to a plurality of pixels includes: a step of forming on a substrate a metal layer having apertures; a step of forming a semiconductor layer on the metal layer; a step of forming a protection layer on the semiconductor layer; a step of forming a resist layer on the protection layer; a photolithography step of irradiating the resist layer with light through the metal layer to pattern the protection layer by photolithography technique; and a step of stacking a reflective layer on the patterned protection layer. A plurality of bumps are formed from the protection layer in the photolithography step, and a plurality of bumps corresponding to the plurality of bumps of the protection layer are formed on the reflective layer.

5 Claims, 10 Drawing Sheets

(56) References Cited

U.S. PATENT DOCUMENTS

| | | |
|---|---|---|
| 6,172,728 B1 | 1/2001 | Hiraishi |
| 7,929,070 B2 * | 4/2011 | Chiang et al. .................. 349/46 |
| 7,969,540 B2 * | 6/2011 | Zhu et al. ...................... 349/114 |
| 8,384,860 B2 * | 2/2013 | Kikuchi et al. ............... 349/113 |
| 8,659,726 B2 * | 2/2014 | Imai et al. ..................... 349/113 |
| 2004/0145689 A1 | 7/2004 | Sugiura et al. |
| 2009/0185119 A1 | 7/2009 | Kikuchi et al. |
| 2009/0195740 A1 | 8/2009 | Imai et al. |
| 2009/0195741 A1 | 8/2009 | Imai et al. |
| 2010/0014031 A1 | 1/2010 | Kikuchi et al. |
| 2010/0045885 A1 | 2/2010 | Imai et al. |
| 2010/0053517 A1 | 3/2010 | Imai et al. |
| 2010/0118238 A1 | 5/2010 | Shimada et al. |
| 2010/0182527 A1 | 7/2010 | Kikuchi et al. |

OTHER PUBLICATIONS

Official Communication issued in International Patent Application No. PCT/JP2009/001301, mailed on Apr. 28, 2009.

Hara et al.; "Liquid Crystal Display and Method for Manufacturing Liquid Crystal Display"; U.S. Appl. No. 12/446,071, filed Apr. 17, 2009.

Imade et al.; "Liquid Crystal Display Device and Method for Manufacturing Liquid Crystal Display Device"; U.S. Appl. No. 12/446,099, filed Apr. 17, 2009.

* cited by examiner

LIQUID CRYSTAL DISPLAY DEVICE AND METHOD FOR MANUFACTURING LIQUID CRYSTAL DISPLAY DEVICE

This application is a 35 U.S.C. 371 National Stage Application of PCT/JP2009/001301, filed on Mar. 24, 2009, which claims the benefit of Japanese Application 2008-126233, which was filed on May 13, 2008.

TECHNICAL FIELD

The present invention relates to a liquid crystal display device, and more particularly to a reflection-type or transflective-type liquid crystal display device capable of performing display by utilizing reflected light.

BACKGROUND ART

Liquid crystal display devices (LCDs) include the transmission-type liquid crystal display device which utilizes backlight from behind the display panel as a light source for displaying, the reflection-type liquid crystal display device which utilizes reflected light of external light, and the transflective-type liquid crystal display device (reflection/transmission-type liquid crystal display device) which utilizes both reflected light of external light and backlight. The reflection-type liquid crystal display device and the transflective-type liquid crystal display device are characterized in that they have smaller power consumptions than that of the transmission-type liquid crystal display device, and their displayed images are easy to see in a bright place, and thus are suitable as display devices for mobile phones, portable electronic devices, and the like. The transflective-type liquid crystal display device has an advantage in that its screen is easier to see than that of the reflection-type liquid crystal display device, even in a dark place.

In the reflection-type liquid crystal display device or the transflective-type liquid crystal display device, in order to perform bright displaying with a wide viewing angle, it is necessary to allow incident light entering the display device to be more uniformly and efficiently reflected by the reflection surface across the entire display surface, without causing specular reflection in one direction. For this purpose, it is better if the reflection surface has moderate ruggednesses, rather than being a complete plane.

Examples of conventional reflection-type liquid crystal display devices are described in Patent Document 1 and Patent Document 2.

On a face of a liquid crystal layer of the liquid crystal display device of Patent Document 1 that faces a TFT substrate, a photosensitive resin layer, an acrylic resin layer, and a reflective layer are stacked in this order. By photolithography technique, minute dents are formed in the photosensitive resin layer, and, conforming to these dents, a non-flat reflection surface is formed on the surface of the reflective layer. According to Patent Document 1, reflected light having excellent light scattering characteristics is obtained with such a reflection surface, whereby displaying contrast is supposedly improved.

Patent Document 2 describes a method of realizing an improvement in the light scattering characteristics of a liquid crystal display device through simple processes. It states that, by polishing the glass substrate surface of a CF (color filter) substrate with polish powder to obtain a coarse face, a liquid crystal display device with excellent light scattering characteristics can be obtained. Moreover, this document also describes a method of improving light scattering characteristics by forming an insulating layer having ruggednesses on a TFT substrate and forming electrodes to function as reflectors on the insulating layer pixel, thus roughening the surface of the pixel electrode.

[Patent Document 1] Japanese Laid-Open Patent Publication No. 5-232465
[Patent Document 2] Japanese Laid-Open Patent Publication No. 8-338993

DISCLOSURE OF INVENTION

Problems to be Solved by the Invention

As in these conventional examples, if ruggednesses can be formed on a reflective layer or pixel electrodes, relatively high light scattering characteristics can be obtained. However, when ruggednesses are formed on a reflective layer according to the photolithography technique of Patent Document 1, it is difficult miniaturize the size of the ruggednesses, and thus very high light scattering characteristics cannot be attained.

On the other hand, when forming ruggednesses by polishing the glass substrate surface as in the liquid crystal display device of Patent Document 2, a separate polishing step is required, thus resulting in a problem of reduced production efficiency. There is also a problem in that impurities such as swarf may be left in the device in a polishing step, thus deteriorating the quality of the liquid crystal display device.

The present invention has been made in view of the above problems, and an objective thereof is to provide at low cost a reflection-type liquid crystal display device or transflective-type liquid crystal display device having a high image quality and a high efficiency of utility of reflected light. Another objective of the present invention is to provide a liquid crystal display device having high light scattering characteristics by forming minute ruggednesses on a reflective layer through relatively simple processes, and to provide a liquid crystal display device having high light scattering characteristics by forming desired slopes on a reflective layer through relatively simple processes.

Means for Solving the Problems

A production method for a liquid crystal display device according to the present invention is a production method for a liquid crystal display device having a plurality of pixels and a plurality of TFTs disposed respectively corresponding to the plurality of pixels, each of the plurality of pixels including a reflection section for reflecting incident light toward a display surface, the production method comprising: a step of forming on a substrate a metal layer having a plurality of apertures; a step of forming a semiconductor layer on the metal layer; a step of forming a protection layer on the semiconductor layer; a step of forming a resist layer on the protection layer; a photolithography step of irradiating the resist layer with light through the metal layer to pattern the protection layer by photolithography technique; and a step of stacking a reflective layer on the patterned protection layer, wherein, a plurality of bumps are formed by patterning the protection layer in the photolithography step, and a plurality of bumps corresponding to the plurality of bumps are formed on the reflective layer.

In one embodiment, the photolithography step comprises: a step of removing photoreacted portions of the resist layer which have been photoreacted by radiating light through the plurality of apertures of the metal layer; and a step of etching the protection layer via the resist layer from which the photoreacted portions have been removed, thereby forming the plurality of bumps on the protection layer.

In one embodiment, the resist layer is left on the plurality of bumps of the protection layer; and the plurality of bumps of the reflective layer are formed corresponding to shapes of the plurality of bumps of the protection layer and the remaining resist layer.

In one embodiment, a step of removing the resist layer on the plurality of bumps of the protection layer is comprised, wherein the plurality of bumps of the reflective layer are formed corresponding to shapes of the plurality of bumps of the protection layer.

In one embodiment, the photolithography step comprises: a step of disposing a photomask on an opposite side of the resist layer from the metal layer; and a step of irradiating the resist layer with light through the photomask to locally photoreact the resist layer.

In one embodiment, the metal layer is formed of a same material as gate electrodes of the TFTs.

In one embodiment, the protection layer is formed of a same material as channel protection layers of the TFTs.

In one embodiment, the reflective layer is formed of a same material as source electrodes and drain electrodes of the TFTs.

In one embodiment, the plurality of bumps of the reflective layer include bumps having a width of 4 µm or less.

A liquid crystal display device according to the present invention is a liquid crystal display device having a plurality of pixels and a plurality of TFTs disposed respectively corresponding to the plurality of pixels, each of the plurality of pixels including a reflection section for reflecting incident light toward a display surface, comprising: a metal layer formed on a substrate, the metal layer having apertures; a semiconductor layer formed on the metal layer; a protection layer formed on the semiconductor layer, the protection layer including a plurality of bumps; and a reflective layer formed on the semiconductor layer, the reflective layer including a plurality of bumps, wherein, the plurality of bumps of the reflective layer are formed corresponding to shapes of the plurality of bumps of the protection layer, and include bumps having a width of 4 µm or less.

In one embodiment, a resist layer exists on the plurality of bumps of the protection layer; and the plurality of bumps of the reflective layer are formed corresponding to shapes of the plurality of bumps of the protection layer and the resist layer.

In one embodiment, the metal layer is formed of a same material as gate electrodes of the TFTs.

In one embodiment, the protection layer is formed of a same material as channel protection layers of the TFTs.

In one embodiment, the reflective layer is formed of a same material as source electrodes and drain electrodes of the TFTs.

EFFECTS OF THE INVENTION

With a production method for a liquid crystal display device according to the present invention, a resist is patterned through a back-face exposure by employing as a mask a metal pattern for wiring that is used for the TFTs. Since a semiconductor layer, etc., having some thickness exist between a metal layer which is the mask pattern and the resist, irradiation light is diffracted between the mask pattern and the resist, so that apertures having broader widths than those of the apertures of the metal layer are formed in the resist. As a result, the width of the remaining resist is made narrower than the width of any metal portion sandwiched between a plurality of apertures of the underlying metal layer, and thus a large number of minute protrusions with a very narrow width are formed in the protection layer. Therefore, a large number of very minute protrusions are also formed on a reflective layer which is formed on the protection layer, a liquid crystal display device having high light diffusing characteristics and a good reflection efficiency can be provided.

In a conventional photolithography step, the distance between the mask and the resist is so short that the resist conforms almost entirely to the mask shape. Therefore, the width of the remaining resist is restricted by the processing accuracy limit of the mask, thus making it difficult to form bump of a very narrow width, (4 µm or less). According to the present invention, bumps of a width (4 µm or less) which is narrower than conventionally can be formed in the resist and the protection layer through the aforementioned back-face exposure, and thus protrusions of a narrow width (4 µm or less) which was conventionally unattainable can be formed also in the reflective layer.

In order to obtain a liquid crystal display device with good viewing angle characteristics by enhancing the reflection efficiency by the reflective layer, it is necessary to form more and more faces on the reflective layer that have a tilting angle (tilting angle with respect to the substrate plane) of 0° to 30°. According to the present invention, since a large number of minute bumps are formed in the reflective layer as mentioned above, a large number of faces with a tilting angle of 0° to 30° are formed on the surface of the reflective layer, whereby the reflection efficiency and viewing angle characteristics of the liquid crystal display device are improved.

Furthermore, according to the present invention, the reflective layer and the bumps of the reflective layer are formed concurrently and from the same material as the constituent elements of the TFT. Therefore, without increasing the production steps, a reflection region having excellent reflection characteristics can be obtained at low cost. Moreover, the production method of the present invention does not require any special steps such as a polishing step for the reflective layer, and thus a high-quality liquid crystal display device can be provided with good production efficiency and low cost.

BRIEF DESCRIPTION OF DRAWINGS

[FIG. 5](*a*) to (*f*) are cross-sectional views schematically showing a former half of a production method of TFTs in Embodiment 1.

[FIG. 6](*g*) to (*j*) are cross-sectional views schematically showing a latter half of a production method of TFTs in Embodiment 1.

[FIG. 7](*a*) to (*f*) are cross-sectional views schematically showing a former half of a production method of a reflection section in Embodiment 1.

[FIG. 8](*g*) to (*j*) are cross-sectional views schematically showing a latter half of a production method of a reflection section in Embodiment 1.

[FIG. 11](a) to (c) are cross-sectional views schematically showing a part of a production method of a reflection section of Reference Example.

[FIG. 14](a) to (c) are cross-sectional view schematically showing a part of a production method of the reflection section of Embodiment 2.

DESCRIPTION OF REFERENCE NUMERALS 10, 10', 10" TFT substrate
12 counter substrate
14 scanning line driving circuit
16 signal line driving circuit
18 control circuit
20, 22 polarizer
24 backlight unit
30 pixel
32 TFT
34 scanning line (gate bus line)
36 signal line (data bus line)
38 pixel electrode
40 storage capacitor line (storage capacitor line, Cs line)
42 insulating layer
44 intermediate electrode
46 protection layer
50 glass substrate
52 gate electrode
54 source electrode (source metal layer)
56 drain electrode (drain metal layer)
58 semiconductor layer
62 contact hole
70 first metal layer
70a Al layer
72 second metal layer
72a Mo layer
74 intrinsic semiconductor layer
74a amorphous silicon layer
75 protection layer
75a silicon nitride layer
76 n$^+$ silicon layer
76a n$^+$a-Si layer
77 third metal layer
78 first metal layer
79 second metal layer
80, 80' resist layer
80a photoresist
82 aperture
84, 84', 84" bump
100 liquid crystal display device

BEST MODE FOR CARRYING OUT THE INVENTION

Hereinafter, with reference to the drawings, liquid crystal display device constructions according to embodiments of the present invention will be described. However, the present invention is not limited to the embodiments described below.

(Embodiment 1)

Figure 1:
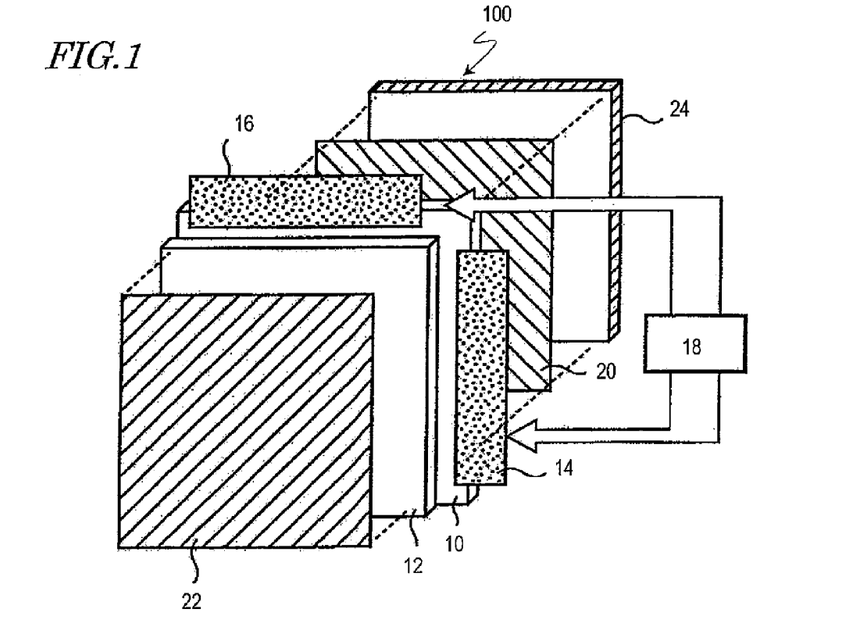
[FIG. 1] A perspective view schematically showing the structure of a liquid crystal display device according to Embodiment 1 of the present invention.
Figure 2:
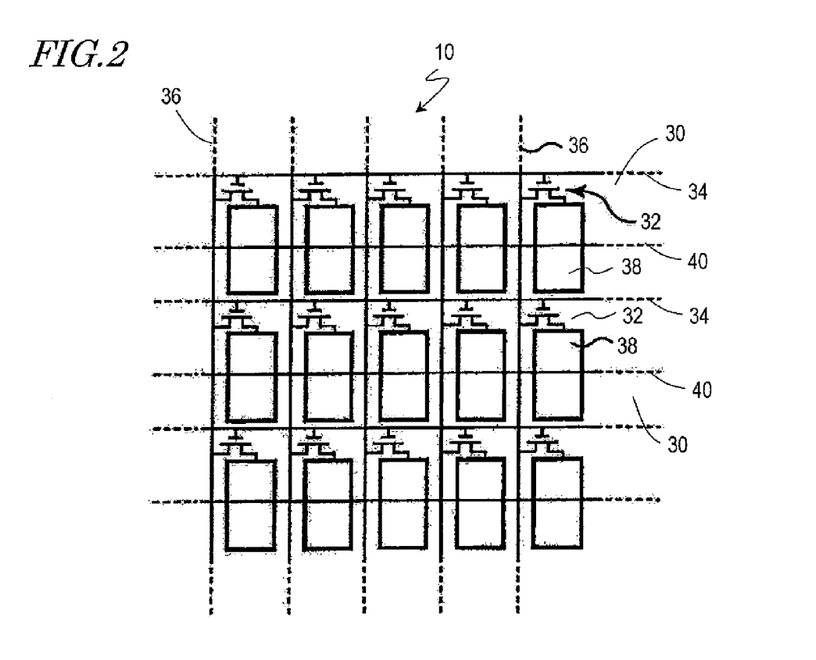
[FIG. 2] A plan view schematically showing the circuit construction of a TFT substrate of the liquid crystal display device of Embodiment 1.

FIG. 1 schematically shows the structure of a liquid crystal display device 100 according to Embodiment 1. FIG. 2 schematically shows the circuit construction of a thin film transistor (TFT) substrate 10 of the liquid crystal display device 100.

As shown in FIG. 1, the liquid crystal display device 100 includes: a TFT substrate 10 and a counter substrate 12, which oppose each other with a liquid crystal layer interposed therebetween; polarizers 20 and 22, which are attached to the respective outer faces of the TFT substrate 10 and the counter substrate 12; and a backlight unit 24 for emitting light for displaying.

As shown in FIG. 2, on the TFT substrate 10, a plurality of scanning lines (gate bus lines) 34 and a plurality of signal lines (data bus lines) 36 are disposed so as to be orthogonal to each other. For each pixel 30, a TFT 32 is formed near an intersection between a scanning line 34 and a signal line 36. A pixel 30 is defined as a region which is partitioned by two adjoining scanning lines 34 and two adjoining signal lines 36, such that a pixel electrode 38 made of ITO (Indium Tin Oxide) is disposed in each pixel 30, the pixel electrode 38 being electrically connected to a drain electrode of the TFT 32. Between two adjoining scanning lines 34, a storage capacitor line (also referred to as a storage capacitor line, a Cs line, or a metal layer) 40 extends in parallel to the scanning lines 34.

The scanning lines 34 and the signal lines 36 are connected to a scanning line driving circuit 14 and a signal line driving circuit 16 shown in FIG. 1, respectively. To each scanning line 34, under the control of a control circuit 18, a scanning signal for switching the TFT 32 ON or OFF is supplied from the scanning line driving circuit 14. To each signal line 36, under the control of the control circuit 18, a display signal (a voltage to be applied to the pixel electrode 38) is supplied from the signal line driving circuit 16.

Figure 3:
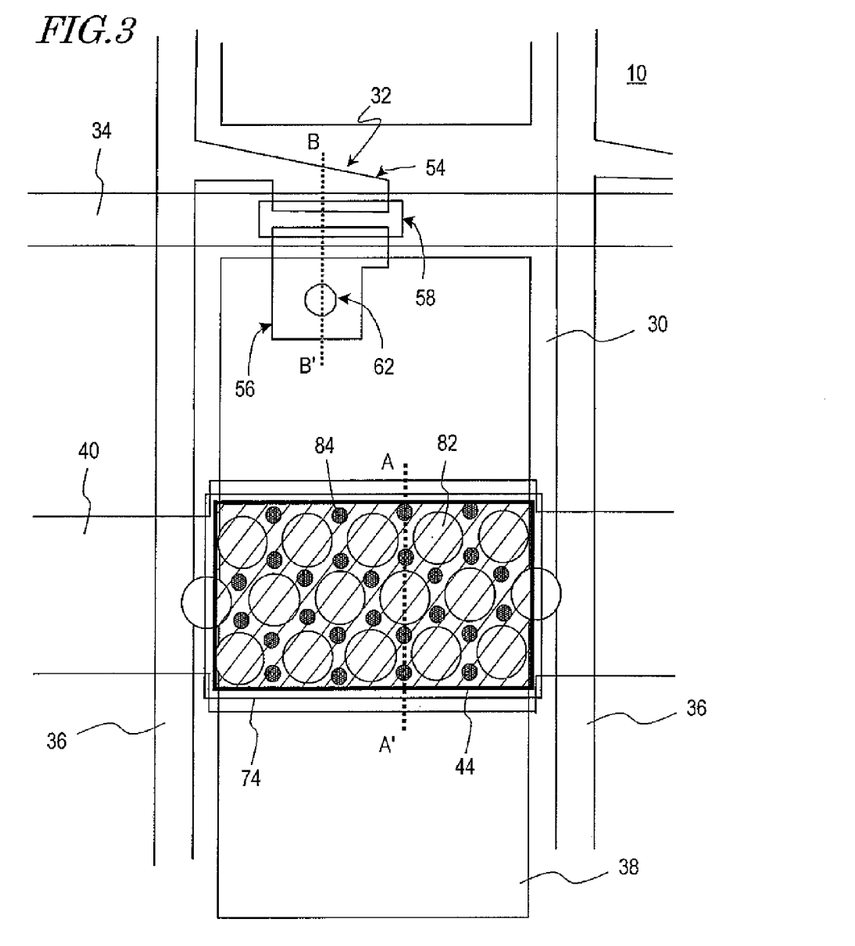
[FIG. 3] A plan view schematically showing the construction of one pixel of the TFT substrate of Embodiment 1.
Figure 4:
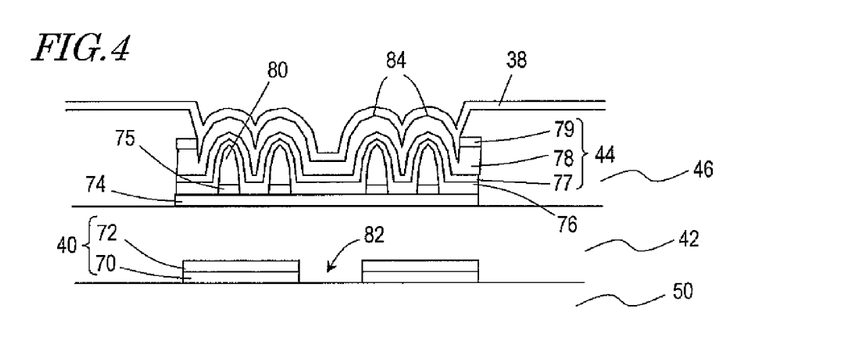
[FIG. 4] A cross-sectional view schematically showing the construction of a reflection section of the TFT substrate of Embodiment 1.

FIG. 3 is a plan view schematically showing the construction of one pixel 30 of the TFT substrate 10. FIG. 4 is a diagram schematically showing a cross-sectional construction of the pixel 30 shown in FIG. 3 at A-A' position.

As shown in FIG. 3, the TFT 32 is formed near where the scanning line 34 and the signal line 36 intersect, and includes a semiconductor layer 58, a source electrode (source metal layer) 54 and a drain electrode (drain metal layer) 56 formed on the semiconductor layer 58, and a gate electrode (gate metal layer) located under the semiconductor layer 58. The gate electrode is a portion of the scanning line 34. The source electrode 54 is electrically connected to the signal line 36, whereas the drain electrode 56 is electrically connected to the pixel electrode 38 via a contact hole 62 which is formed in an insulating layer.

The semiconductor layer 58 includes an intrinsic semiconductor layer made of intrinsic amorphous silicon and formed on the scanning line 34, a channel protection layer and an ohmic contact layer made of n$^+$ amorphous silicon formed on the intrinsic semiconductor layer. The thicknesses of the intrinsic semiconductor layer and the ohmic contact layer are respectively 120 nm and 30 nm, for example.

As shown in FIG. 4, each storage capacitor line 40 has a two-layer structure including a first metal layer 70 formed on a glass substrate 50 and a second metal layer 72 formed on the first metal layer 70, and has a plurality of apertures 82. The width of each aperture 82 (the largest width of the aperture as seen from a direction perpendicular to the substrate plane) is 9 μm or less.

The first metal layer 70 is made of aluminum (Al), whereas the second metal layer 72 is made of molybdenum (Mo). The first metal layer 70 has a thickness of e.g. 130 nm, whereas the second metal layer 72 has a thickness of e.g. 70 nm. The first metal layer 70 may be made of an aluminum alloy obtained by adding one or more metals, e.g., neodymium (Nd), silicon (Si), copper (Cu), titanium (Ti), tungsten (W), tantalum (Ta), or scandium (Sc), to aluminum. Moreover, the second metal layer 72 may be made of chromium (Cr), titanium (Ti), tantalum (Ta), or tungsten (W), or an alloy of any such metal. The scanning line 34 (including the gate electrode) is formed concurrently and from the same material as the storage capacitor line 40, so as to have the same structure.

On the storage capacitor line 40, an intrinsic semiconductor layer 74 of amorphous silicon (a-Si) is formed via an insulating layer 42 interposed therebetween. On the intrinsic semiconductor layer 74, a protection layer 75 made of silicon nitride, an $n^+$ silicon layer 76 made of phosphorus-doped $n^+$ amorphous silicon, and an intermediate electrode 44 are formed in this order. The pixel electrode is disposed in contact with an upper face of the intermediate electrode 44.

The protection layer 75 is formed as a plurality of protrusions which are separated into island shapes, with a resist layer 80 being formed on each protrusion. Therefore, between the intrinsic semiconductor layer 74 and the $n^+$ silicon layer 76, a plurality of bumps are formed, each being composed of a protrusion of the protection layer 75 and the resist layer 80. Conforming to the shapes of these bumps, a plurality of bumps 84 are formed on the intermediate electrode 44 functioning as an overlying reflective layer. Furthermore, conforming to such shape of the intermediate electrode 44, a plurality of bumps are also formed on the pixel electrode 38. The plurality of bumps include a large number of bumps whose width (i.e., the largest width of each bump as seen from a direction perpendicular to the substrate plane) is 4 µm or less. In other words, a large number of protrusions of the protection layer 75 and resist layers 80 on the protrusions are formed so as to have a width of 4 µm or less. These widths are preferably formed to be about 2 µm.

The intrinsic semiconductor layer 74, the protection layer 75, and the $n^+$ silicon layer 76 respectively correspond to the active semiconductor layer, the channel protection layer, and the ohmic contact layer of the TFT 32, and are formed concurrently and from the same material as these layers.

The intermediate electrode 44 has a three-layer structure including a first metal layer 78, a second metal layer 79 disposed on the first metal layer 78, and a third metal layer 77 disposed under the first metal layer 78. The first metal layer 78 is made of the same metal as the first metal layer 70 of the storage capacitor line 40, whereas the second metal layer 79 and the third metal layer 77 are made of the same metal as the second metal layer 72 of the storage capacitor line 40. The signal line 36 and the source electrode 54 and drain electrode 56 of the TFT 32 are also formed concurrently with the intermediate electrode 44, so as to have the same structure.

The intermediate electrode 44 functions also as a storage capacitor electrode (also called a storage capacitor electrode or a Cs electrode). The topmost second metal layer 79 in the intermediate electrode 44 is in electrical contact with the pixel electrode 38, such that a storage capacitor (Cs) is constituted by the storage capacitor line 40, the intermediate electrode 44, and a dielectric material interposed therebetween. Moreover, the intermediate electrode 44 also functions as a reflective layer, such that, when the pixel 30 is seen from a direction perpendicular to the substrate plane, the portion where the first metal layer 78 and the pixel electrode 38 are in contact function as a reflection region. Note that the portion where the intermediate electrode 44 is formed may be considered as the reflection region. Any other region in which the intermediate electrode 44, the storage capacitor line 40, the TFT 32, and the like are not formed, and which is capable of transmitting light from the backlight, constitutes a transmission region of the pixel 30.

Figure 5:
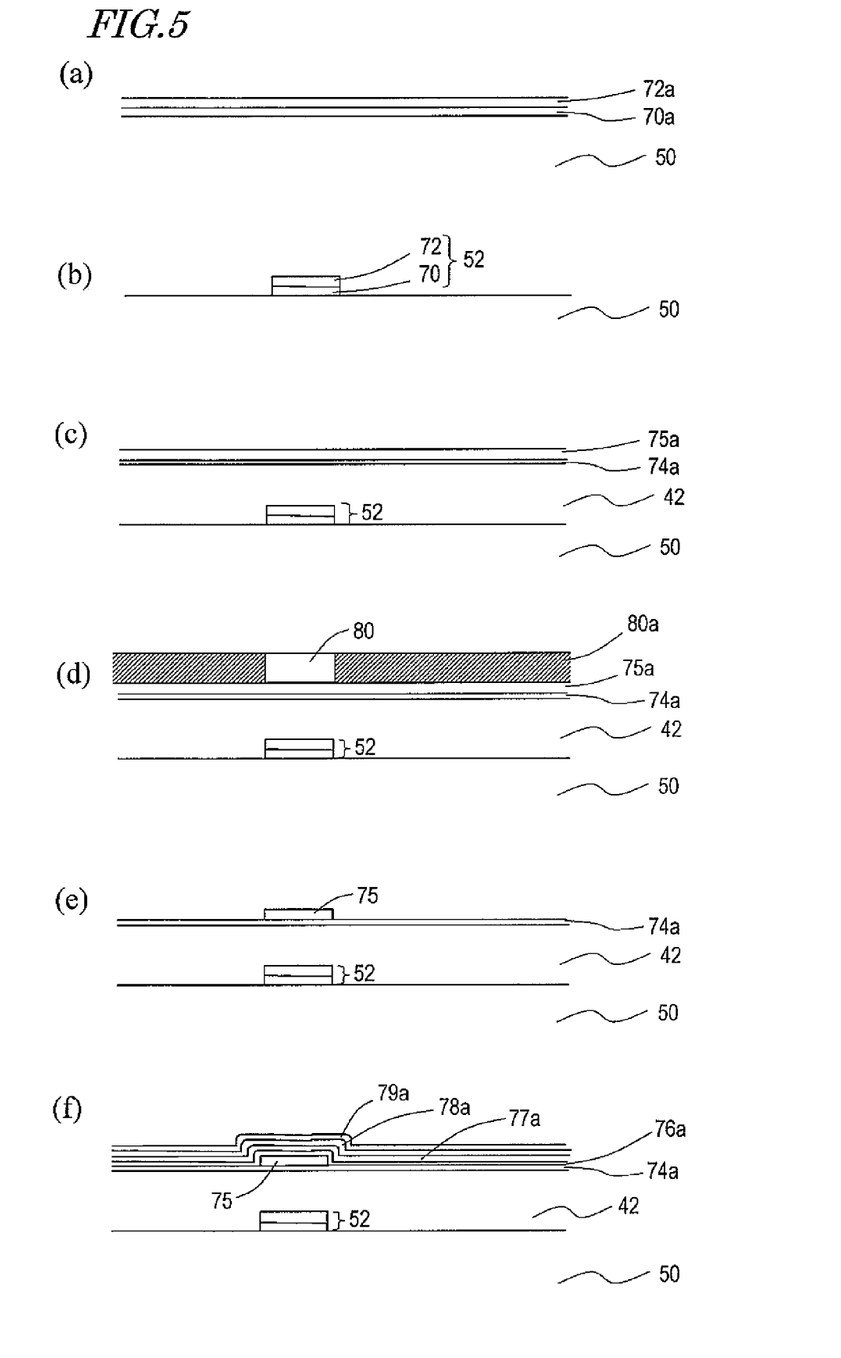
Figure 6:
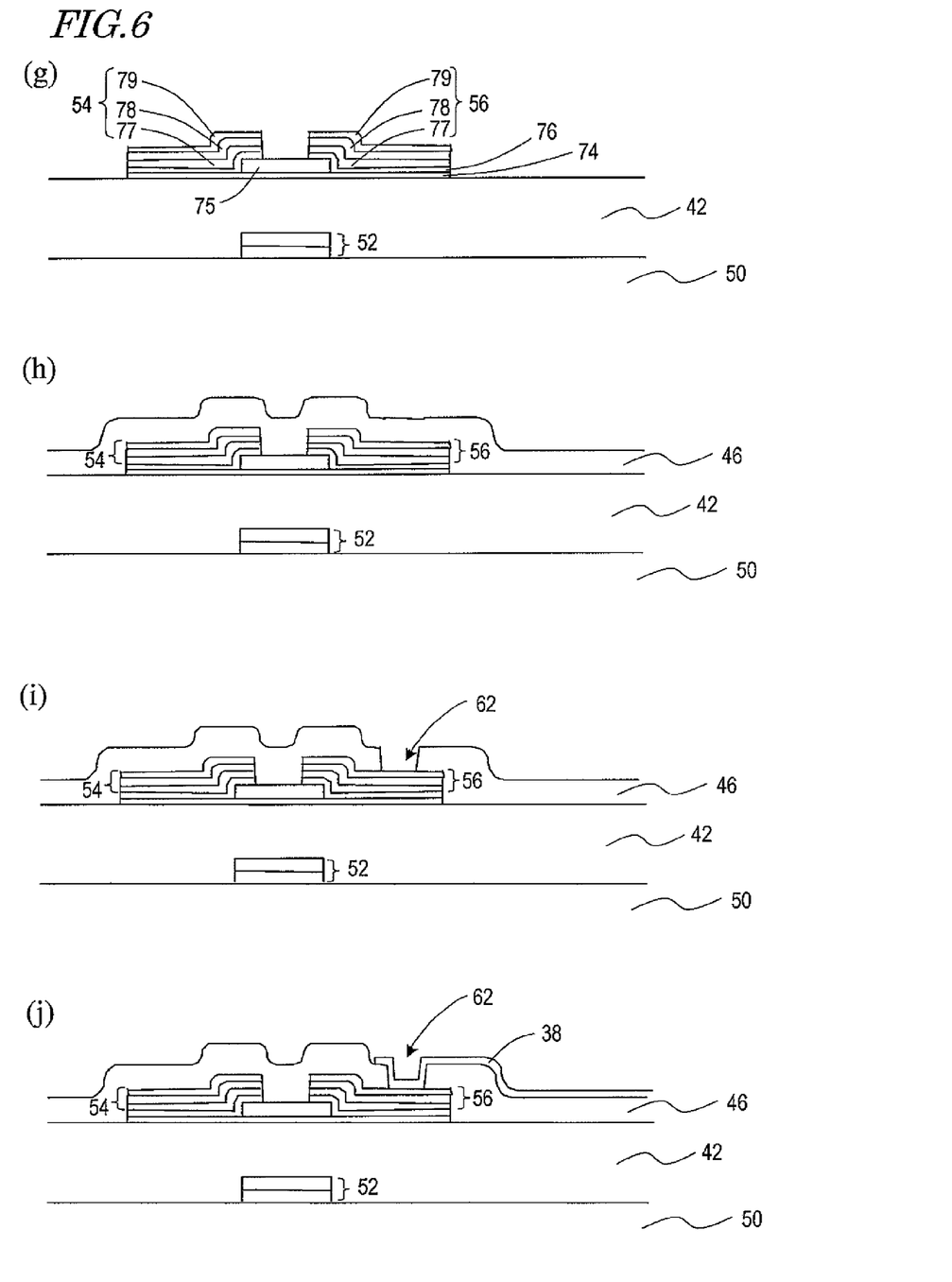
Figure 7:
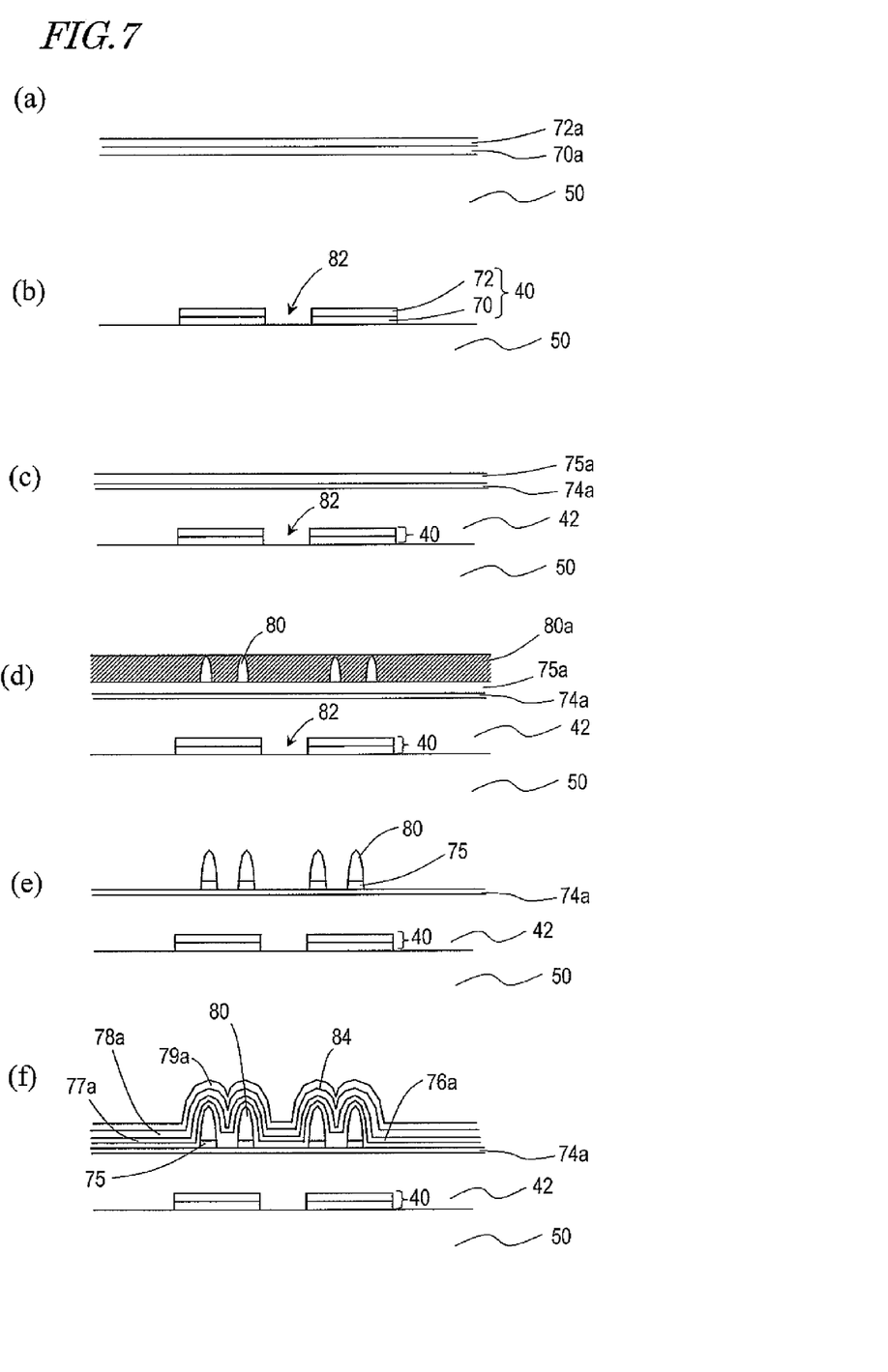
Figure 8:
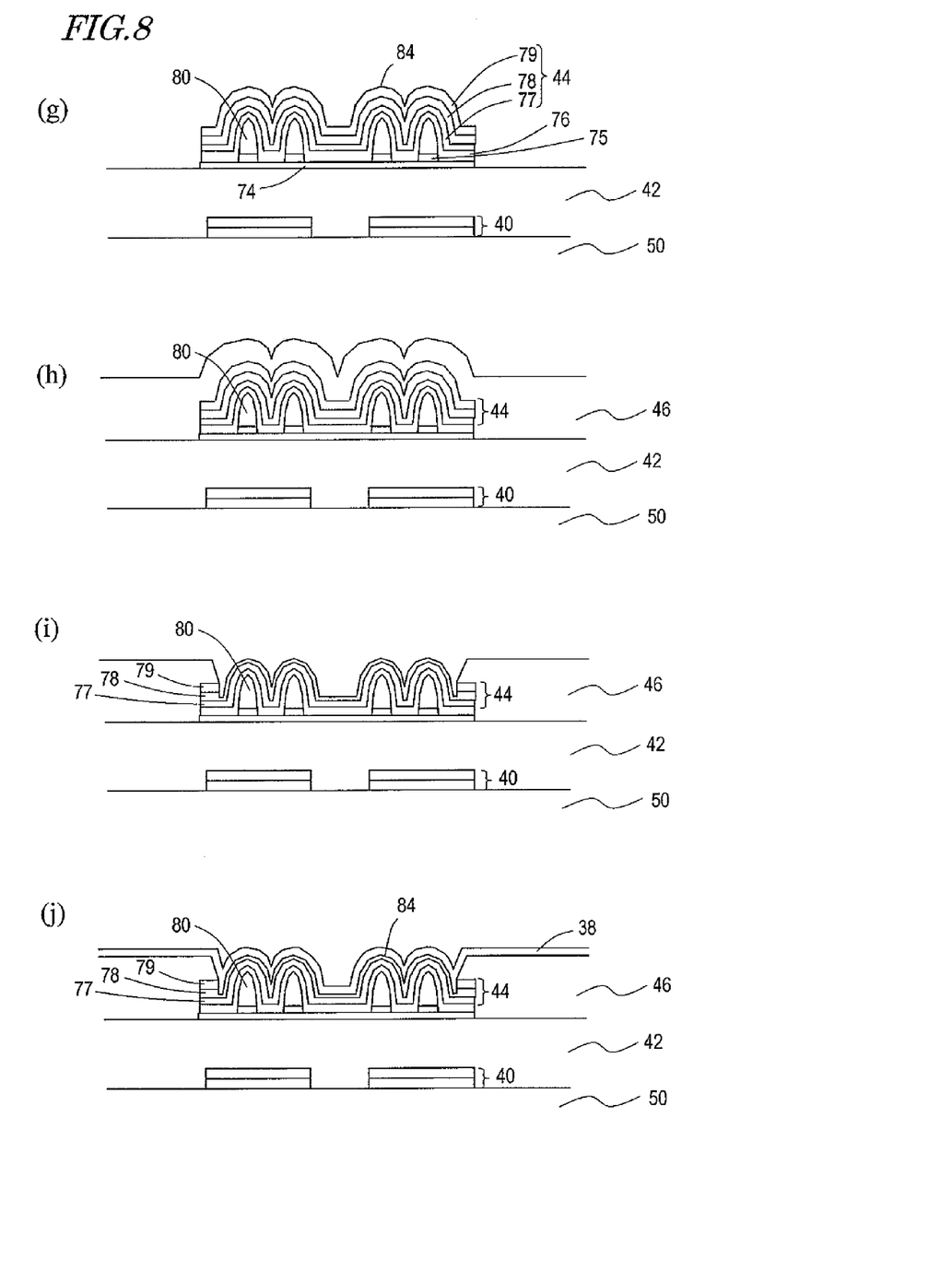

Next, a production method for the TFT substrate 10 will be described with reference to FIG. 5 to FIG. 8. (a) to (f) in FIG. 5 and (g) to (j) in FIG. 6 are cross-sectional views describing a method of forming a TFT 32 on the TFT substrate 10, showing production processes at B-B' cross section in FIG. 3. (a) to (f) in FIG. 7 and (g) to (j) in FIG. 8 are cross-sectional views describing a method of forming a reflection section of a pixel 30, showing production processes at A-A' cross section in FIG. 3.

First, as shown in FIG. 5(a) and FIG. 7(a), Al is stacked on an upper face of the glass substrate 50 to a thickness of 130 nm by sputtering, thus obtaining an Al layer 70a. Next, on the stacked Al layer 70a, Mo is stack to a thickness of 70 nm by sputtering, thus obtaining an Mo layer 72a. If necessary, a protection layer of silicon oxide ($SiO_x$) or the like may be formed on the glass substrate 50, and the Al layer 70a may be formed on that protection layer. The Al layer 70a may be formed of an aluminum alloy obtained by adding one or more metals such as Nd, Si, Cu, Ti, W, Ta, or Sc to Al. Moreover, the Mo layer 72a may be formed of Cr, Ti, Ta, or W, or an alloy of any such metal.

Thereafter, a resist film is formed on the Mo layer 72a by spin coating technique, and after patterning the resist film by photolithography technique, a wet etching using a mixed solution of acetic acid, nitric acid, and phosphoric acid is performed, whereby a gate electrode 52 composed of the first metal layer 70 and the second metal layer 72 as shown in FIG. 5(b) and a storage capacitor line 40 composed of the first metal layer 70 and the second metal layer 72 as shown in FIG. 7(b) are formed. At this time, a plurality of apertures 82 are formed in the storage capacitor line 40. Each of the plurality of apertures 82 has a width of 9 µm or less. At this step, a scanning line 34 is also concurrently formed.

Next, as shown in FIG. 5(c) and FIG. 7(c), on the entire substrate, an insulating layer (gate insulating layer) 42 composed of a silicon nitride film (SiN) having a thickness of about 400 nm is stacked by plasma CVD technique. Thereafter, by plasma CVD technique, about 30 nm of amorphous silicon is stacked on the entire substrate to form an amorphous silicon layer 74a, upon which a silicon nitride layer 75a having a thickness of about 150 nm is formed.

Thereafter, as shown in FIG. 5(d) and FIG. 7(d), after applying a photoresist 80a onto the entire substrate by spin coating or the like, the photoresist 80a is irradiated with light through the glass substrate 50 by using the gate electrode 52, the scanning line 34, and the storage capacitor line 40 as a mask, thus performing a back-face exposure. As a result, a portion of the photoresist 80a is photoreacted (in the figure, the photoreacted portion of the photoresist 80a is shown hatched), whereby unphotoreacted resist layers 80 are left on the gate electrode 52, the scanning line 34, and the storage capacitor line 40.

Now, since the insulating layer 42, the amorphous silicon layer 74a, and the silicon nitride layer 75a exist between the storage capacitor line 40 functioning as a mask pattern and the photoresist 80a, irradiation light is diffracted between the storage capacitor line 40 and the photoresist 80a, so that apertures having broader widths than those of the apertures 82 of the storage capacitor line 40 are formed in the photoresist 80a. Since a large number of apertures 82 are formed across the entire storage capacitor line 40 as shown in FIG. 3, a plurality of narrow-width resist layers 80 as shown in FIG. 7(d) are formed, in a self-aligning manner, by diffracted light which is transmitted not only through the aperture 82 shown in FIG. 7(*d*) but also through other apertures 82 which are formed in front and rear directions of the plane of the figure, as well as light which is diffracted from outside of the storage capacitor line 40.

Thereafter, by subjecting the photoresist 80*a* to further exposure from the forward direction (i.e., from above the figure) through a mask (second mask), a resist pattern is formed such that unphotoreacted resist layers 80 are left only above regions where the protection layer 75 is to be formed. Herein, any photoresist 80*a* above the storage capacitor line 40 located outside the reflection region and any photoresist 80*a* above the scanning line 34 and the signal line 36 located outside the TFT 32 are photoreacted. Next, after the photoreacted photoresist 80*a* is removed, the silicon nitride layer 75*a* is subjected to a dry etching with a fluorine-type gas by using the resist layers 80 as an etching mask, whereby a protection layer (channel protection layer) 75 having a shape shown in FIG. 5(*e*) and FIG. 7(*e*) is formed.

Next, the resist layers 80 are subjected to an exposure from the forward direction through a third mask, and thereafter the photoreacted resist layers 80 are removed. As a result, the resist layers 80 are left only on some portions of the storage capacitor line 40 (see FIG. 7(*e*)), whereas the resist layer 80 on the gate electrode 52 is removed (see FIG. 5(*e*)). In this manner, bumps composed of the protection layer 75 and resist layers 80 with a very narrow width (4 µm or less) can be formed on the storage capacitor line 40.

Next, after cleaning the surface of the amorphous silicon layer 74*a* with dilute hydrofluoric acid to remove any unnecessary oxide film, an n$^+$a-Si layer 76*a* is promptly formed to a thickness of about 30 nm on the entire substrate by plasma CVD technique. The n$^+$a-Si layer 76*a* is later patterned to become an n$^+$ silicon layer (ohmic contact layer) 76. Thereafter, via sputtering, a Ti layer 77*a* having a thickness of 40 nm, an Al layer 78*a* having a thickness of 100 nm, and a Ti layer 79*a* having a thickness of 80 nm are sequentially stacked, thus obtaining a multilayer structure shown in FIG. 5(*f*) and FIG. 7(*f*). Through subsequent patterning, the Ti layer 77*a*, the Al layer 78*a*, and the Ti layer 79*a* respectively become a third metal layer 77, a first metal layer 78, and a second metal layer 79.

Herein, a plurality of bumps (protrusions) 84 conforming to the shapes of the protection layer 75 and the resist layers 80 are formed on the n$^+$a-Si layer 76*a*, the Ti layer 77*a*, the Al layer 78*a*, and the Ti layer 79*a*. The Ti layer 77*a* and the Ti layer 79*a* may be formed of Cr, Mo, Ta, W, or an alloy of any such metal. Moreover, the Al layer 78*a* may be formed of an aluminum alloy obtained by adding one or more metals such as Nd, Si, Cu, Ti, W, Ta, or Sc to Al.

Next, a photoresist layer is formed on the entire substrate, and after the resist is subjected to exposure by using a fourth mask, the resist layer is patterned via development. Thereafter, by using the patterned resist layer as an etching mask, a dry etching using a chorine-type gas is performed for the Ti layer 79*a*, the Al layer 78*a*, the Ti layer 77*a*, the n$^+$a-Si layer 76*a*, and the amorphous silicon layer 74*a*, whereby a multilayer structure shown in FIG. 6(*g*) and FIG. 8(*g*) is obtained. In this etching treatment, since the protection layer (channel protection layer) 75 functions as an etching stopper, the amorphous silicon layer 74*a* in the channel section of the TFT is left without being etched, so that an intrinsic semiconductor layer (active semiconductor layer) 74 of a desired shape can be formed.

Through this step, in the TFT section, a source electrode 54 and a drain electrode 56 each composed of the first metal layer 78, the second metal layer 79, and the third metal layer 77 are formed on a semiconductor layer composed of the intrinsic semiconductor layer 74, the protection layer 75, and the n$^+$ silicon layer 76. Moreover, in the reflection section, an intermediate electrode 44 composed of the first metal layer 78, the second metal layer 79, and the third metal layer 77 is formed, on a multilayer structure composed of the intrinsic semiconductor layer 74, the protection layer 75, the resist layers 80, and the n$^+$ silicon layer 76.

Next, as shown in FIG. 6(*h*) and FIG. 8(*h*), a silicon nitride film (SiN), for example, is formed to a thickness of about 300 nm on the entire substrate by plasma CVD technique, thus forming a protection layer 46.

Then, a photoresist layer is formed on the entire substrate, and after subjecting the resist to an exposure by using a fifth mask, the resist layer is patterned via development. Thereafter, a dry etching using a gaseous mixture of a fluorine (F)-type gas and oxygen (O$_2$) gas, with the resist layer as an etching mask, a contact hole 62 is formed on the drain electrode 56 as shown in FIG. 6(*i*), and the first electrode 78 of the intermediate electrode 44 is revealed as shown in FIG. 8(*i*). In this step, contact holes are also formed in a terminal formation region (not shown).

Next, for example, a film of ITO is formed to a thickness of about 100 nm on the entire substrate, by a thin-film formation technique such as sputtering. Next, a resist mask of a predetermined pattern is formed by using a sixth mask, and a wet etching using oxalic acid is performed, thereby forming a pixel electrode (transparent electrode) 38 as shown in FIG. 6(*j*) and FIG. 8(*j*). The pixel electrode 38 is formed in such a manner that it is electrically connected to the drain electrode 56 within the contact hole 62 in the TFT section, and that it is in electrical contact with the intermediate electrode 44 in the reflection section. In this manner, on the pixel electrode 38 formed on the intermediate electrode 44, a plurality of bumps conforming to the plurality of bumps 84 of the intermediate electrode 44 are formed.

(Reference Example)

Next, a liquid crystal display device of Reference Example to be used for comparison against the liquid crystal display device of the present invention will be described.

Figure 9:
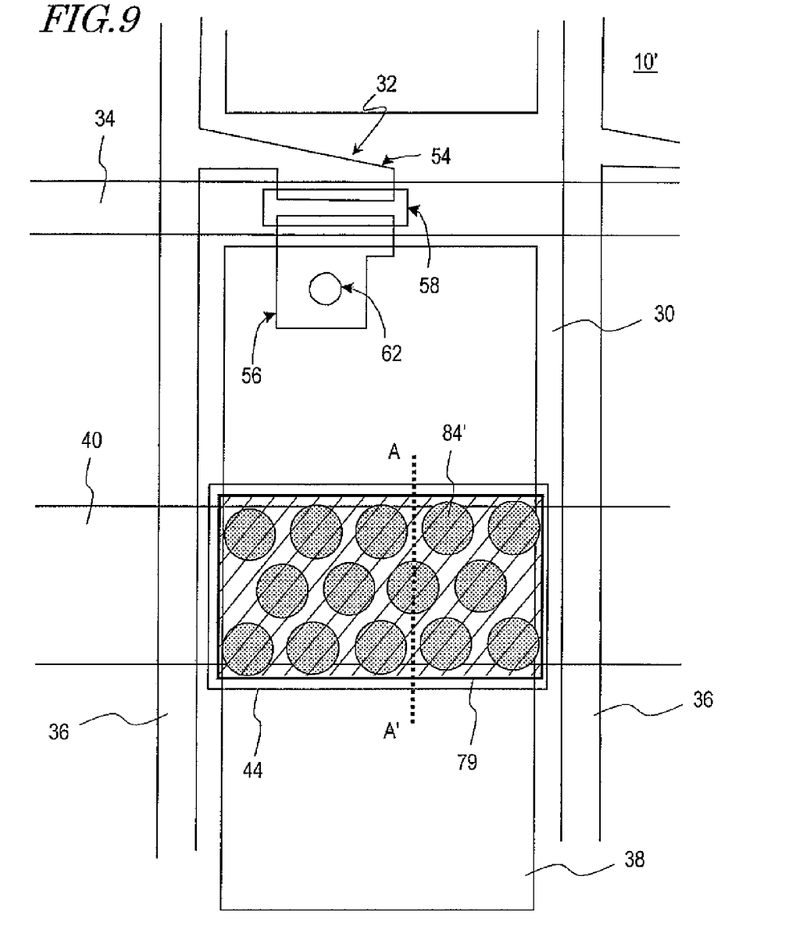
[FIG. 9] A plan view schematically showing the construction of one pixel of the TFT substrate of Reference Example.
Figure 10:
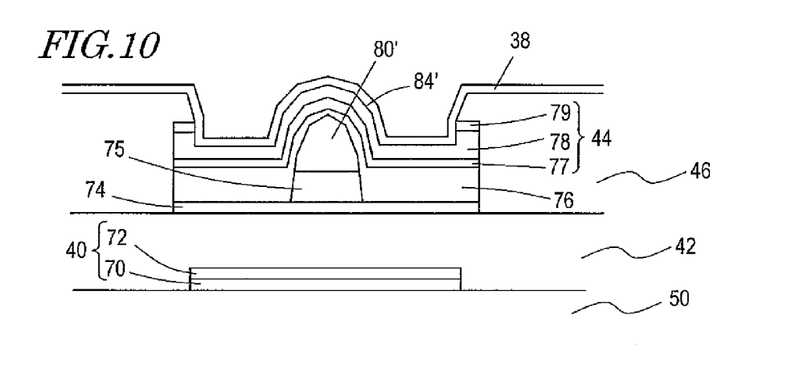
[FIG. 10] A cross-sectional view schematically showing the construction of a reflection section of a TFT substrate of Reference Example.

FIG. 9 is a plan view schematically showing the construction of one pixel 30 of a TFT substrate 10' of a liquid crystal display device according to Reference Example. FIG. 10 is a diagram schematically showing the construction of a cross section at A-A' position of the pixel 30 shown in FIG. 9. Note that the fundamental construction of the liquid crystal display device of Reference Example is identical to the construction of Embodiment 1 as shown in FIG. 1 and FIG. 2, and the description thereof is omitted. In the following description, any constituent element that is identical to a constituent element of Embodiment 1 will be denoted by a like reference numeral, and the description thereof will be partly omitted.

As shown in FIG. 9, as in Embodiment 1, a TFT 32 of the TFT substrate 10' of Reference Example is formed near where a scanning line 34 and a signal line 36 intersect, and includes a semiconductor layer 58, a source electrode 54 and a drain electrode 56 formed on the semiconductor layer 58, and a gate electrode located under the semiconductor layer 58. A plurality of bumps 84' are formed on a pixel electrode 38 above a storage capacitor line 40.

As shown in FIG. 10, the storage capacitor line 40 has a two-layer structure including a first metal layer 70 and a second metal layer 72 formed on a glass substrate 50. On the storage capacitor line 40, via an insulating layer 42, an intrinsic semiconductor layer 74, a protection layer 75, an n$^+$ silicon layer 76, an intermediate electrode 44, and the pixel electrode 38 are formed in this order. The intermediate electrode 44 has a three-layer structure including a first metal layer 78, a second metal layer 79, and a third metal layer 77. Between the protection layer 75 and the n+ silicon layer 76, a resist layer (protrusion layer) 80' having a plurality of bumps is formed, and conforming to the shape of this resist layer (protrusion layer) 80', a plurality of bumps 84' are formed on the overlying intermediate electrode 44.

Figure 11:
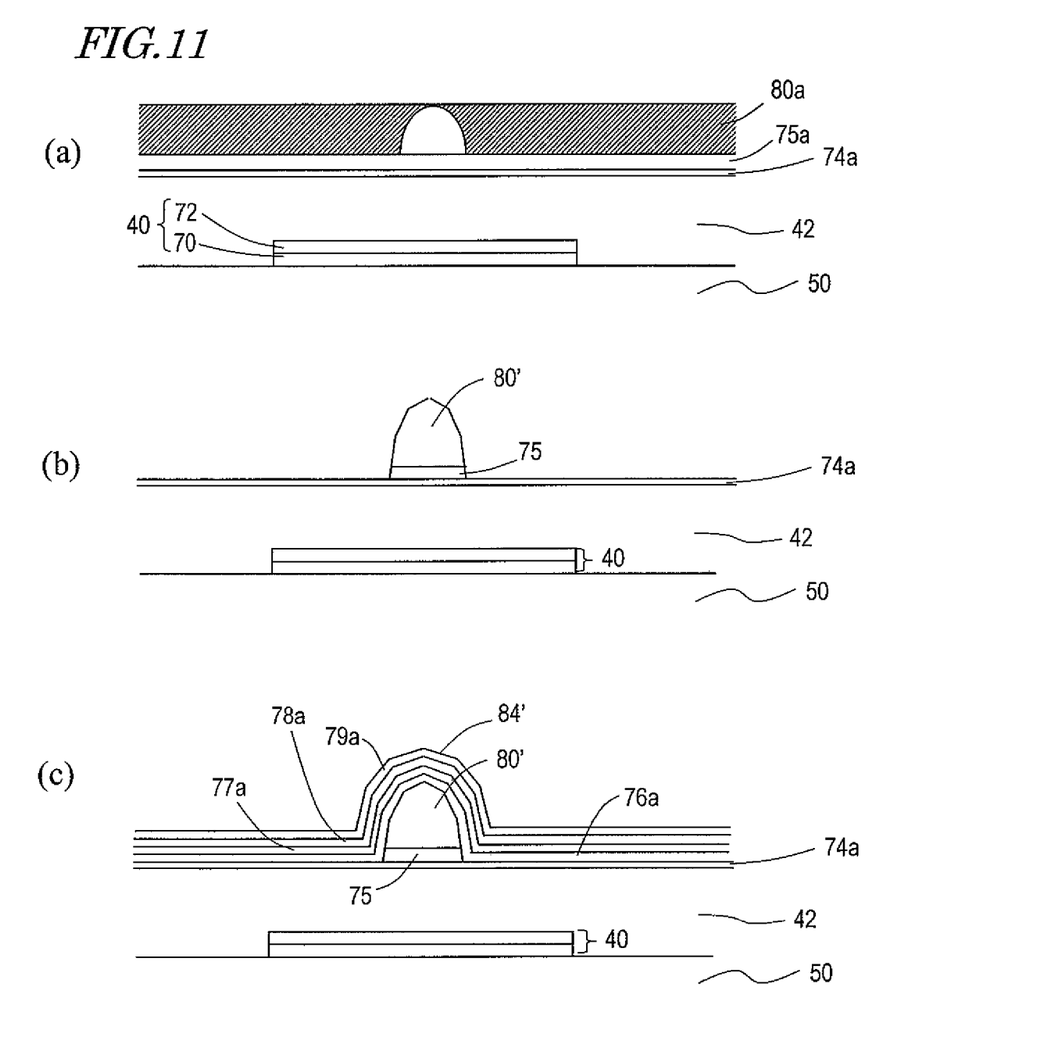

Next, a production method for the TFT substrate 10' will be described with reference to FIG. 11. Hereinafter, steps which are different from those of the production method of Embodiment 1 will be mainly described, and the description of any identical step will be omitted. In FIG. 11, (a) to (c) are cross-sectional views showing a part of the steps of forming a reflection section of the pixel 30 of the TFT substrate 10', and show production processes at A-A' cross section in FIG. 9. Note that the steps shown in (a) to (c) of FIG. 11 correspond to the steps of (d) to (f) in FIG. 7.

First, via the steps shown in (a) to (c) of FIG. 7 of Embodiment 1, a multilayer structure including the storage capacitor line 40, the insulating layer 42, an amorphous silicon layer 74a, and a silicon nitride layer 75a shown in FIG. 7(c) is formed on the glass substrate 50.

Thereafter, after applying a photoresist 80a onto the entire substrate by spin coating or the like, the resist is subjected to an exposure from the forward direction (i.e., from above the figure) through a mask, thereby photoreacting the photoresist 80a (a hatched portion in FIG. 11(a)) excluding the portion (resist layers 80') above the storage capacitor line 40, as shown in FIG. 11(a).

Next, after removing the photoreacted photoresist 80a, an etching treatment is performed for the silicon nitride layer 75a from above the resist layers 80', thus obtaining a multilayer structure including the protection layer 75 as shown in FIG. 11(b).

Next, after cleaning the surface of the amorphous silicon layer 74a with dilute hydrofluoric acid to remove any unnecessary oxide film, an n+a-Si layer 76a is promptly formed on the entire substrate by plasma CVD technique. Thereafter, a Ti layer 77a, an Al layer 78a, and a Ti layer 79a are sequentially stacked by sputtering, thus obtaining a multilayer structure shown in FIG. 11(c). Herein, bumps 84' corresponding to the shapes of the protection layer 75 and the resist layers 80' are formed on the Ti layer 77a, the Al layer 78a, and the Ti layer 79a.

Thereafter, through steps similar to those described with reference to (g) to (j) of FIG. 8, a reflection section structure as shown in FIG. 10 is obtained. However, in this production method, when the photoresist 80a is subjected to exposure, the distance between the mask and the photoresist 80a is so short that the photoresist 80a conforms almost entirely to the mask shape. Therefore, the width of the remaining resist layer is restricted by the processing accuracy limit of the mask, thus making it difficult to form bumps of a very narrow width (4 μm or less).

(Embodiment 2)

Next, a liquid crystal display device according to Embodiment 2 of the present invention will be described.

Figure 12:
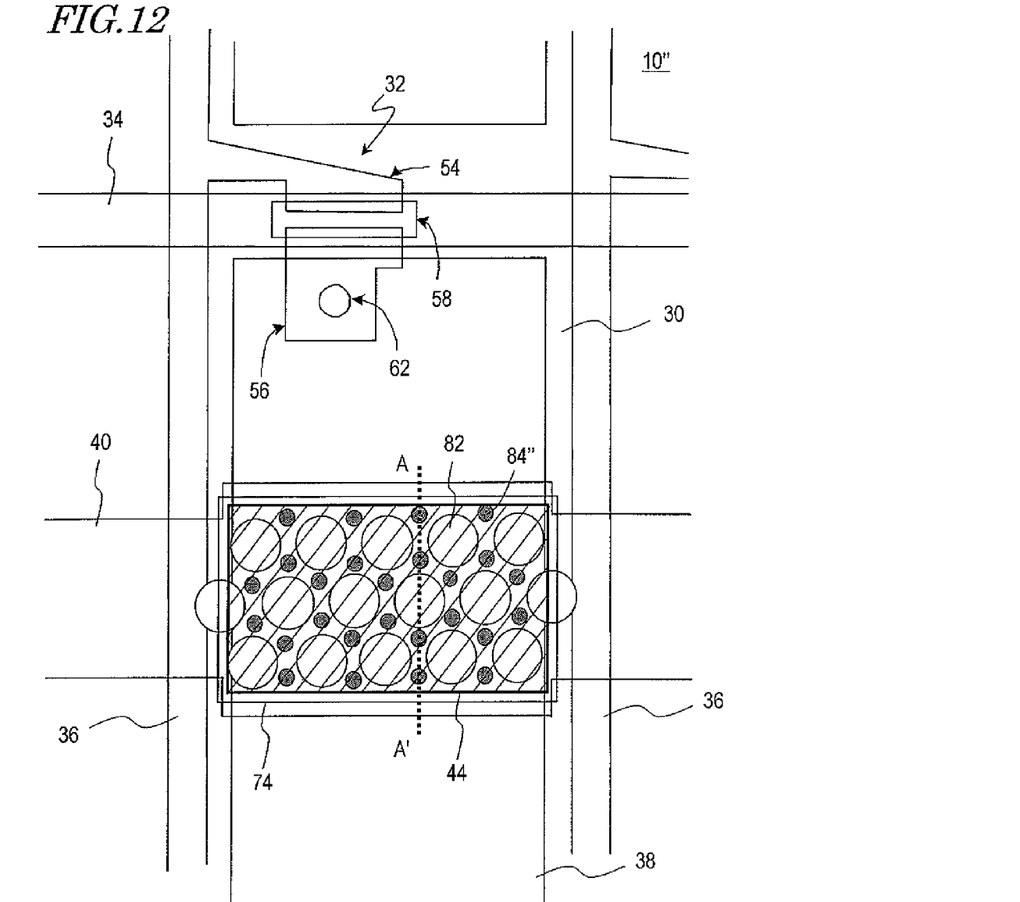
[FIG. 12] A plan view schematically showing the construction of one pixel of a TFT substrate of Embodiment 2.
Figure 13:
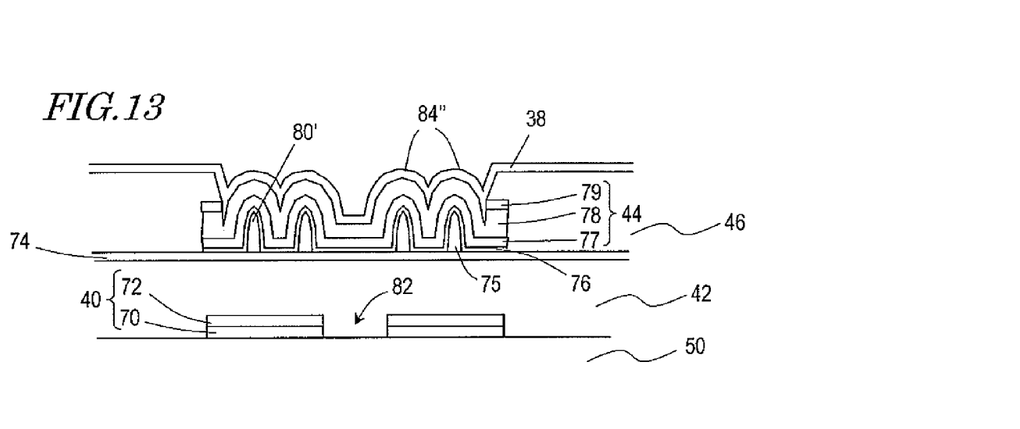
[FIG. 13] A cross-sectional view schematically showing the construction of a reflection section of the TFT substrate of Embodiment 2.

FIG. 12 is a plan view schematically showing the construction of one pixel 30 of a TFT substrate 10" of a liquid crystal display device according to Embodiment 2. FIG. 13 is a diagram schematically showing the construction of a cross section at A-A' position of the pixel 30 shown in FIG. 12. Note that the fundamental construction of Embodiment 2 is similar to the construction of Embodiment 1 as shown in FIG. 1 and FIG. 2, and the description thereof is omitted. In the following description, any constituent element that is identical to a constituent element of Embodiment 1 will be denoted by a like reference numeral, and the description thereof will be partly omitted.

As shown in FIG. 12, as in Embodiment 1, a TFT 32 of the TFT substrate 10" of Embodiment 2 is formed near where a scanning line 34 and a signal line 36 intersect, and includes a semiconductor layer 58, a source electrode 54 and a drain electrode 56 formed on the semiconductor layer 58, and a gate electrode located under the semiconductor layer 58. A plurality of bumps 84" are formed on a pixel electrode 38 above a storage capacitor line 40.

As shown in FIG. 13, the storage capacitor line 40 has a two-layer structure including a first metal layer 70 and a second metal layer 72 formed on a glass substrate 50. A plurality of apertures 82 are formed in the storage capacitor line 40. On the storage capacitor line 40, via an insulating layer 42, an intrinsic semiconductor layer 74, a protection layer 75, an n+ silicon layer 76, an intermediate electrode 44, and a pixel electrode 38 are formed in this order. The intermediate electrode 44 has a three-layer structure including a first metal layer 78, a second metal layer 79, and a third metal layer 77.

The protection layer 75 disposed between the intrinsic semiconductor layer 74 and the n+ silicon layer 76 is patterned into a shape having a plurality of bumps, and conforming to the shape of the protection layer 75, the plurality of bumps 84" are formed in the overlying intermediate electrode 44 and pixel electrode 38.

Next, a production method for the TFT substrate 10" will be described with reference to FIG. 14. Hereinafter, steps which are different from those of the production method of Embodiment 1 will be mainly described, and the description of any identical step will be omitted.

Figure 14:
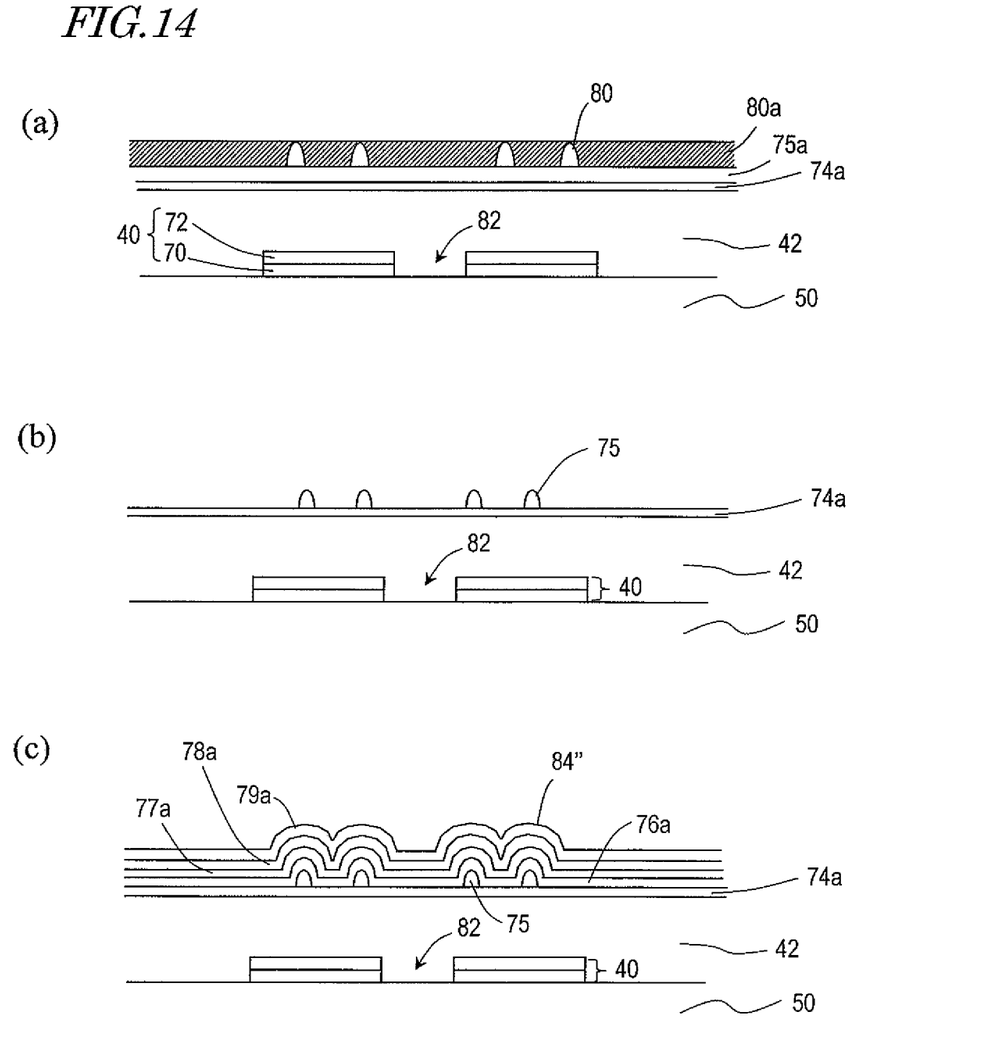

In FIG. 14, (a) to (c) are cross-sectional views showing a part of the steps of forming a reflection section of the pixel 30 of the TFT substrate 10", and show production processes as viewed at A-A' cross section in FIG. 12. Note that the steps shown in (a) to (c) of FIG. 14 correspond to the steps of (d) to (f) in FIG. 7.

First, via the steps shown in (a) to (c) of FIG. 7 of Embodiment 1, a multilayer structure including the storage capacitor line 40, the insulating layer 42, an amorphous silicon layer 74a, and a silicon nitride layer 75a shown in FIG. 7(c) is formed on the glass substrate 50.

Next, after applying a photoresist 80a onto the entire substrate by spin coating or the like, the photoresist 80a is irradiated with light through the glass substrate 50 by using the gate electrode 52, the scanning line 34, and the storage capacitor line 40 as a mask, thus performing a back-face exposure. As a result, as shown in FIG. 14(a), a portion of the photoresist 80a is photoreacted (a hatched portion in FIG. 14(a)), whereby unphotoreacted resist layers 80 are left on the gate electrode 52, the scanning line 34, and the storage capacitor line 40.

Now, since the insulating layer 42, the amorphous silicon layer 74a, and the silicon nitride layer 75a exist between the storage capacitor line 40 functioning as a mask pattern and the photoresist 80a, irradiation light is diffracted between the storage capacitor line 40 and the photoresist 80a, so that apertures having broader widths than those of the apertures 82 of the storage capacitor line 40 are formed in the photoresist 80a. Since a large number of apertures 82 are formed across the entire storage capacitor line 40 as shown in FIG. 12, a plurality of resist layers 80 having a narrow width (with a width of 4 μm or less, preferably 2.5 μm) as shown in FIG. 14(a) are formed, in a self-aligning manner, by diffracted light which is transmitted not only through the aperture 82 shown in FIG. 14(a) but also through other apertures 82 which are formed in front and rear directions of the plane of the figure, as well as light which is diffracted from outside of the storage capacitor line 40.

Thereafter, by subjecting the photoresist 80a to further exposure from the forward direction (i.e., from above the figure) through a mask (second mask), a resist pattern is formed such that unphotoreacted resist layers 80 are left only above regions where the protection layer 75 is to be formed. Herein, any photoresist 80a above the storage capacitor line 40 located outside the reflection region and any photoresist 80a above the scanning line 34 and the signal line 36 located outside the TFT 32 are photoreacted.

Next, after the photoreacted photoresist 80a is removed, the silicon nitride layer 75a is subjected to a dry etching with a fluorine-type gas by using the resist layers 80 as an etching mask, whereby a protection layer 75 having a shape as shown in FIG. 14(b) is formed. Thereafter, the resist layers 80 are removed, whereby a multilayer structure as shown in FIG. 14(b) is obtained. In this manner, bumps composed of the protection layer 75 with a very narrow width (4 μm or less) are formed on the storage capacitor line 40. The protection layer 75 is a protrusion layer which provides a basis for forming the bumps 84" on the intermediate electrode 44.

Next, after cleaning the surface of the amorphous silicon layer 74a with dilute hydrofluoric acid to remove any unnecessary oxide film, an n$^+$a-Si layer 76a is promptly formed to a thickness of about 30 nm on the entire substrate by plasma CVD technique. The n$^+$a-Si layer 76a is later patterned to become an n$^+$ silicon layer (ohmic contact layer) 76. Thereafter, via sputtering, a Ti layer 77a having a thickness of 40 nm, an Al layer 78a having a thickness of 100 nm, and a Ti layer 79a having a thickness of 80 nm are sequentially stacked, thus obtaining a multilayer structure shown in FIG. 14(c).

Thereafter, through steps similar to those described with reference to (g) to (j) of FIG. 8, a reflection section structure as shown in FIG. 13 is obtained.

In Embodiment 2, since the protection layer 75 serves as a protrusion layer for forming the bumps 84" on the intermediate layer 44, a step of removing the resist layer 80 in the TFT section while leaving the resist layer 80 in the reflection section, as in Embodiment 1, is not required. Therefore, the production steps can be simplified as compared to Embodiment 1.

As has been illustrated by the above Embodiments, in a liquid crystal display device according to the present invention, a large number of minute protrusions can be formed on the surface of a reflective layer, so that a large number of level differences and corner portions are formed on the surface of the reflective layer. Therefore, a reflection region with broad effective reflection surfaces (faces with a tilting angle of 0° to 30°) and excellent scattering characteristics can be obtained, and a liquid crystal display device having a high brightness and being capable of clear displaying can be provided. Moreover, the level differences and corner portions of the reflection surface (intermediate electrode) are formed concurrently and from the same material as a layer composing the TFTs, thus making it possible to provide a liquid crystal display device having a high reflection efficiency with a good production efficiency and inexpensively.

INDUSTRIAL APPLICABILITY

According to the present invention, a reflection-type liquid crystal display device and a transflective-type liquid crystal display device having a high image quality can be provided with a good production efficiency. Liquid crystal display devices according to the present invention are suitably used for various reflection-type and transflective-type liquid crystal display devices, e.g., mobile phones, onboard display devices such as car navigation systems, display devices of ATMs and vending machines, etc., portable display devices, laptop PCs, and the like.

The invention claimed is:

1. A liquid crystal display device having a plurality of pixels and a plurality of thin film transistors (TFTs) disposed respectively corresponding to the plurality of pixels, each of the plurality of pixels including a reflection section for reflecting incident light toward a display surface, comprising:
   a metal layer formed on a substrate, the metal layer having apertures;
   a semiconductor layer formed on the metal layer;
   a protection layer formed on the semiconductor layer, the protection layer including a plurality of bumps; and
   a reflective layer formed on the semiconductor layer, the reflective layer including a plurality of bumps, wherein,
   the plurality of bumps of the reflective layer are formed corresponding to shapes of the plurality of bumps of the protection layer, and include bumps having a width of 4 μm or less.

2. The liquid crystal display device of claim 1, wherein,
   a resist layer exists on the plurality of bumps of the protection layer; and
   the plurality of bumps of the reflective layer are formed corresponding to shapes of the plurality of bumps of the protection layer and the resist layer.

3. The liquid crystal display device of claim 1, wherein the metal layer is formed of a same material as gate electrodes of the TFTs.

4. The liquid crystal display device of claim 1, wherein the protection layer is formed of a same material as channel protection layers of the TFTs.

5. The liquid crystal display device of claim 1, wherein the reflective layer is formed of a same material as source electrodes and drain electrodes of the TFTs.

* * * * *